United States Patent
Park et al.

(10) Patent No.: US 8,923,254 B2
(45) Date of Patent: Dec. 30, 2014

(54) METHOD IN WHICH A GROUP OF TERMINALS RECEIVES A DOWNLINK CONTROL CHANNEL, AND METHOD IN WHICH THE TERMINALS MAKE REQUESTS FOR BANDWIDTH IN A WIRELESS COMMUNICATION SYSTEM IN WHICH THE SAME STID OR C-RNTI IS ALLOCATED TO THE GROUP OF TERMINALS

(75) Inventors: Kyujin Park, Anyang-si (KR); Hangyu Cho, Anyang-si (KR); Seunghyun Kang, Anyang-si (KR)

(73) Assignee: LG Electronics, Seoul (KR)

( * ) Notice: Subject to any disclaimer, the term of this patent is extended or adjusted under 35 U.S.C. 154(b) by 261 days.

(21) Appl. No.: 13/697,513

(22) PCT Filed: May 18, 2011

(86) PCT No.: PCT/KR2011/003683
§ 371 (c)(1),
(2), (4) Date: Nov. 12, 2012

(87) PCT Pub. No.: WO2011/145884
PCT Pub. Date: Nov. 24, 2011

(65) Prior Publication Data
US 2013/0058317 A1  Mar. 7, 2013

Related U.S. Application Data

(60) Provisional application No. 61/345,610, filed on May 18, 2010.

(51) Int. Cl.
H04J 3/00 (2006.01)
H04W 72/12 (2009.01)
H04L 5/00 (2006.01)
H04W 4/00 (2009.01)

(52) U.S. Cl.
CPC ......... H04W 72/1289 (2013.01); H04L 5/0053 (2013.01); H04L 5/0092 (2013.01); H04L 5/0023 (2013.01)
USPC .......................................... 370/336; 370/329

(58) Field of Classification Search
None
See application file for complete search history.

(56) References Cited

U.S. PATENT DOCUMENTS

| 2008/0233941 | A1 | 9/2008 | Jen |
| 2010/0093386 | A1 | 4/2010 | Damnjanovic et al. |
| 2010/0098050 | A1 | 4/2010 | Yamada et al. |
| 2010/0189071 | A1 | 7/2010 | Kitazoe |
| 2013/0114494 | A1* | 5/2013 | Yuk et al. ...................... 370/312 |

* cited by examiner

Primary Examiner — Ayaz Sheikh
Assistant Examiner — Sori Aga
(74) Attorney, Agent, or Firm — McKenna Long & Aldridge LLP

(57) ABSTRACT

The present invention relates to a method in which a group of terminals receives a downlink control channel, and to a method in which the terminals make requests for bandwidth in a wireless communication system in which the same station identifier (STID) or cell-radio network temporary identifier (C-RNTI) is allocated to the group of terminals. The method, in which a group of terminals to which the same STID or C-RNTI is allocated receive a downlink control channel, comprises the following steps: receiving, from a base station, information on the STID or C-RNTI allocated to the terminals; receiving information on a time domain in which the downlink control channel for the terminals is transmitted, information on a frequency domain, or information on a search space from the base station; and decoding the downlink control channel on the basis of the information on a time domain, the information on a frequency domain, or the information on a search space, and on the basis of the STID or C-RNTI.

20 Claims, 8 Drawing Sheets

FIG. 3
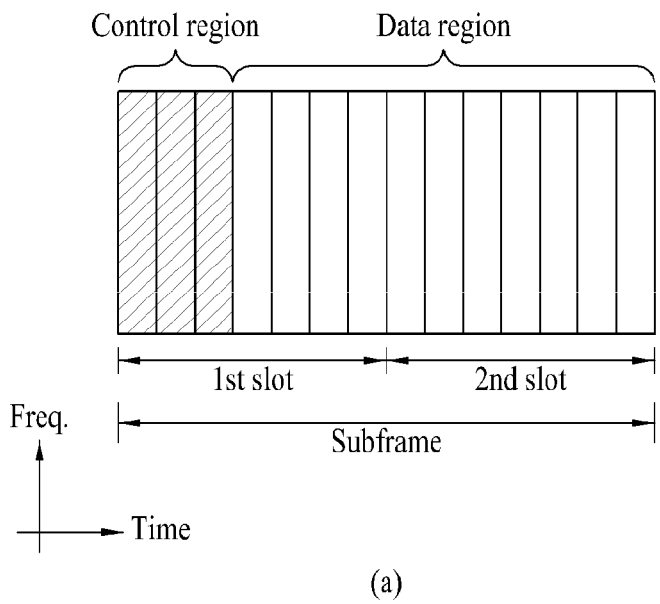
(a)
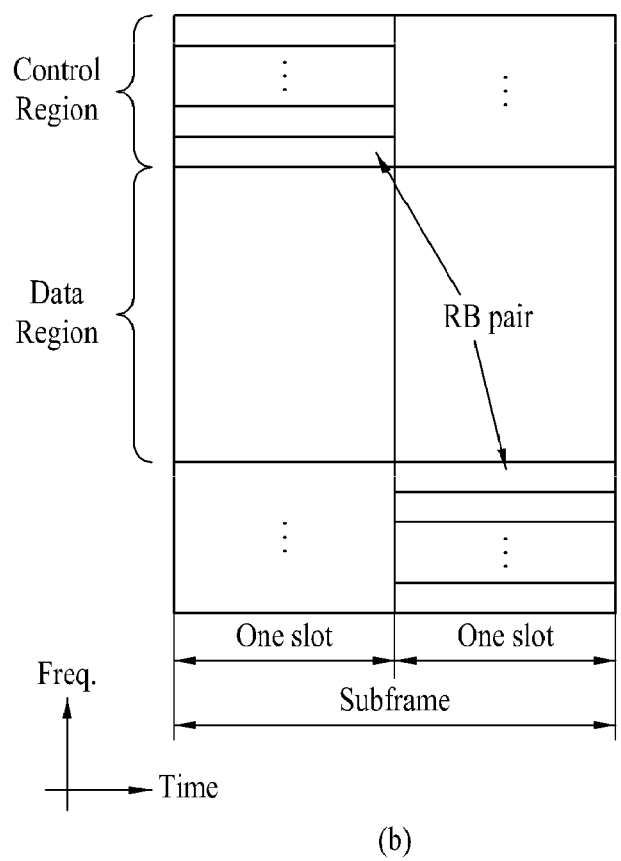
(b)

METHOD IN WHICH A GROUP OF TERMINALS RECEIVES A DOWNLINK CONTROL CHANNEL, AND METHOD IN WHICH THE TERMINALS MAKE REQUESTS FOR BANDWIDTH IN A WIRELESS COMMUNICATION SYSTEM IN WHICH THE SAME STID OR C-RNTI IS ALLOCATED TO THE GROUP OF TERMINALS

This Application is a 35 U.S.C. §371 National Stage Entry of International Application No. PCT/KR2011/003683, filed May 18, 2011 and claims the benefit of U.S. Provisional Application No. 61/345,610, filed May 18, 2010, all of which are incorporated by reference in their entirety herein.

TECHNICAL FIELD

The present invention relates to wireless communication, and more particularly, to a method for receiving a downlink control channel and transmitting a bandwidth request channel in a wireless communication system in which the same station identifier (STID) or cell-radio network temporary identifier (C-RNTI) is allocated to a group of terminals.

BACKGROUND ART

The term "machine to machine (M2M) communication" refers to communication that is performed between electronic devices. Although, in a broad sense, the term "M2M communication" refers to wired or wireless communication between electronic devices or communication between a device that is controlled by a human and a machine, the term has generally been used recently to indicate wireless communication between electronic devices, i.e., wireless communication between devices.

In the early 1990's when the M2M communication concept was introduced, M2M was considered a concept such as remote control or telematics and associated markets were greatly limited. However, in recent years, M2M communication has been continuously rapidly developed to create a new market that is attracting domestic and global attention. Especially, M2M communication has exerted a great influence upon fields such as Point Of Sale (POS) and fleet management in the security-related application market and a smart meter for automatically measuring the amount of consumed heat or electricity, measuring an operating time of construction equipment and facilities, and remote monitoring machines and facilities. In the future, M2M communication will be used for a wider variety of purposes, in combination with existing mobile communication and wireless high-speed Internet or low-power communication solutions such as Wi-Fi and Zig-Bee, and will no longer be limited to the B2B market, expanding into a B2C market.

In the M2M communication era, all machines equipped with a SIM card can transmit and receive data such that it is possible to remotely manage and control all such machines. For example, the application range of M2M communication technology is very broad such that M2M communication technology can be used for a great number of devices and equipment such as cars, trucks, trains, containers, vending machines, and gas tanks.

Terminals have been generally managed in individual units, and thus communication between a base station (BS) and a mobile station (MS) has been one to one communication. In such an environment, when considering numerous M2M terminals (or M2M devices), it is expected that the network would be overloaded due to signaling generated between each of the individual s and the base station. As stated above, when M2M communication is rapidly distributed and widely used, overhead due to communication between M2M terminals or communication between M2M terminals and the base station may become a problem.

Further, the base station of the mobile communication system now needs to allocate even the STID, which is allocated when entering the network, to the M2M terminal. However, rapidly increasing all M2M terminals cannot be supported with the STID having a size of 12 bits in the existing IEEE 802.16m system. However, a method for allocating the STID and transmitting a control channel for supporting massive devices has not been specifically suggested up to now.

DISCLOSURE

Technical Problem

An object of the present invention devised to solve the problem lies in providing a method for receiving, by a mobile station (MS), a downlink control channel in a wireless communication system which allocates the same station identifier (STID) or cell-radio network temporary identifier (C-RNTI) to grouped terminals.

Another object of the present invention devised to solve the problem lies in providing a method for transmitting, by a mobile station, a bandwidth request channel in a wireless communication system which allocates the same STID or C-RNTI to grouped terminals.

Yet another object of the present invention devised to solve the problem lies in providing a mobile station for receiving a downlink control channel in a wireless communication system which allocates the same STID or C-RNTI to grouped terminals.

Yet another object of the present invention devised to solve the problem lies in providing a mobile station for transmitting a bandwidth request channel in a wireless communication system which allocates the same STID or C-RNTI to grouped terminals.

Technical Solution

An object of the present invention can be achieved by providing a method for receiving, by a mobile station (MS), a downlink control channel in a wireless communication system which allocates the same station identifier (STID) or cell-radio network temporary identifier (C-RNTI) to grouped MSs including receiving information of a STID or C-RNTI information allocated to the MS from a base station, receiving, from the base station, at least time domain information, frequency domain information or search space information for transmitting the downlink control channel to the MS, and decoding the downlink control channel based on the STID or C-RNTI and at least the time domain information, the frequency domain information or the search space information. The time domain is one of a subframe unit, a frame unit and a superframe unit, and the time domain information, the frequency domain information or the search space information is received from one of an AAI-REG-RSP message, an AAI-HO-CMD message, an AAI-RNG-RSP message and an AAI-SBC-RSP message.

The time domain information includes information of period value and a offset value of a subframe allocated to the MS, and the downlink control channel may be decoded based on the period value, the offset value and the STID or the C-RNTI. The time domain information may represent at least a subframe index, a frame index or a superframe index.

In another aspect of the present invention, provided herein is a method for transmitting, by a mobile station, a bandwidth request (BR) channel in a wireless communication system which allocates the same station identifier (STID) or cell-radio network temporary identifier (C-RNTI) to grouped MSs including receiving, from a base station, at least time domain information, a bandwidth request index value or bandwidth request opportunity information for transmission of the bandwidth request channel allocated to the MS, and transmitting the bandwidth request channel using at least the time domain information, the bandwidth request index value or the bandwidth request opportunity information, wherein the time domain, the bandwidth request index value and the bandwidth request opportunity allocated to the MS are distinguished from a time domain, a bandwidth request index value and a bandwidth request opportunity of one or more other MSs which are grouped as a same group and thereby have a same STID or C-RNTI.

In another aspect of the present invention, provided herein is a mobile station (MS) for receiving a downlink control channel in a wireless communication system which allocates the same station identifier (STID) or cell-radio network temporary identifier (C-RNTI) to grouped MSs including a receiver configured to receive, from a base station, a STID or C-RNTI information allocated to the mobile station, and receive at least time domain information, frequency domain information and search space information with which the downlink control channel for the MS is transmitted, and a processor configured to decode the downlink control channel based on the STID or C-RNTI and at least the time domain information, the frequency domain information or the search space information.

In another aspect of the present invention, provided herein is a mobile station for transmitting a bandwidth request (BR) channel in a wireless communication system which allocates the same station identifier (STID) or cell-radio network temporary identifier (C-RNTI) to grouped MSs including a receiver configured to receive, from a base station, at least time domain information, a bandwidth request index value or bandwidth request opportunity information for transmission of the bandwidth request channel allocated to the MS, and a transmitter configured to transmit the bandwidth request channel using at least the time domain information, the bandwidth request index value or the bandwidth request opportunity information, wherein the time domain, the bandwidth request index value and the bandwidth request opportunity allocated to the MS are distinguished from a time domain, a bandwidth request index value and a bandwidth request opportunity of one or more other MSs which are grouped as a same group and thereby have a same STID or C-RNTI.

Advantageous Effects

According to the present invention, as M2M terminals rapidly increase in number, when allocating the same STID or C-RNTI to grouped terminals, reception of a downlink control channel, transmission of a bandwidth request channel, and the CID identification problem, etc. may be resolved.

The effects of the present invention are not limited to the effects mentioned above, and other effects will be clearly understood by those skilled in the art from the disclosure below.

DESCRIPTION OF DRAWINGS

The accompanying drawings, which are included to provide a further understanding of the invention, illustrate embodiments of the invention and together with the description serve to explain the principle of the invention.

FIGS. 3a and 3b illustrate the structure of a downlink and uplink subframe of a 3GPP LTE system which is an example of a mobile communication system.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following descriptions will be given in detail with reference to the case in which the wireless communication system is an IEEE 802.16 system, 3GPP LTE, or LTE-A system, the following descriptions, except descriptions specific to IEEE 802.16, 3GPP LTE, and LTE-A system, may be applied to any other wireless communication system.

In some instances, known structures and devices are omitted or shown in block diagram form, focusing on important features of the structures and devices, so as not to obscure the concept of the present invention. The same reference numbers will be used throughout this specification to refer to the same or like parts.

In the following description, the term "User Equipment (UE)" is used to generally describe any mobile or stationary user device such as a Mobile Station (MS), or an Advanced Mobile Station (AMS). In addition, the term "base station" is used to generally describe any network node that communicates with the terminal such as a Node B, an eNode B, or an Access Point (AP).

In a wireless communication system, a User Equipment can receive information through downlink from a base station and can transmit information through uplink. Information transmitted or received by the user equipment includes data and various control information and various physical channels are provided according to the type or usage of the information transmitted or received by the User Equipment.

Figure 1:
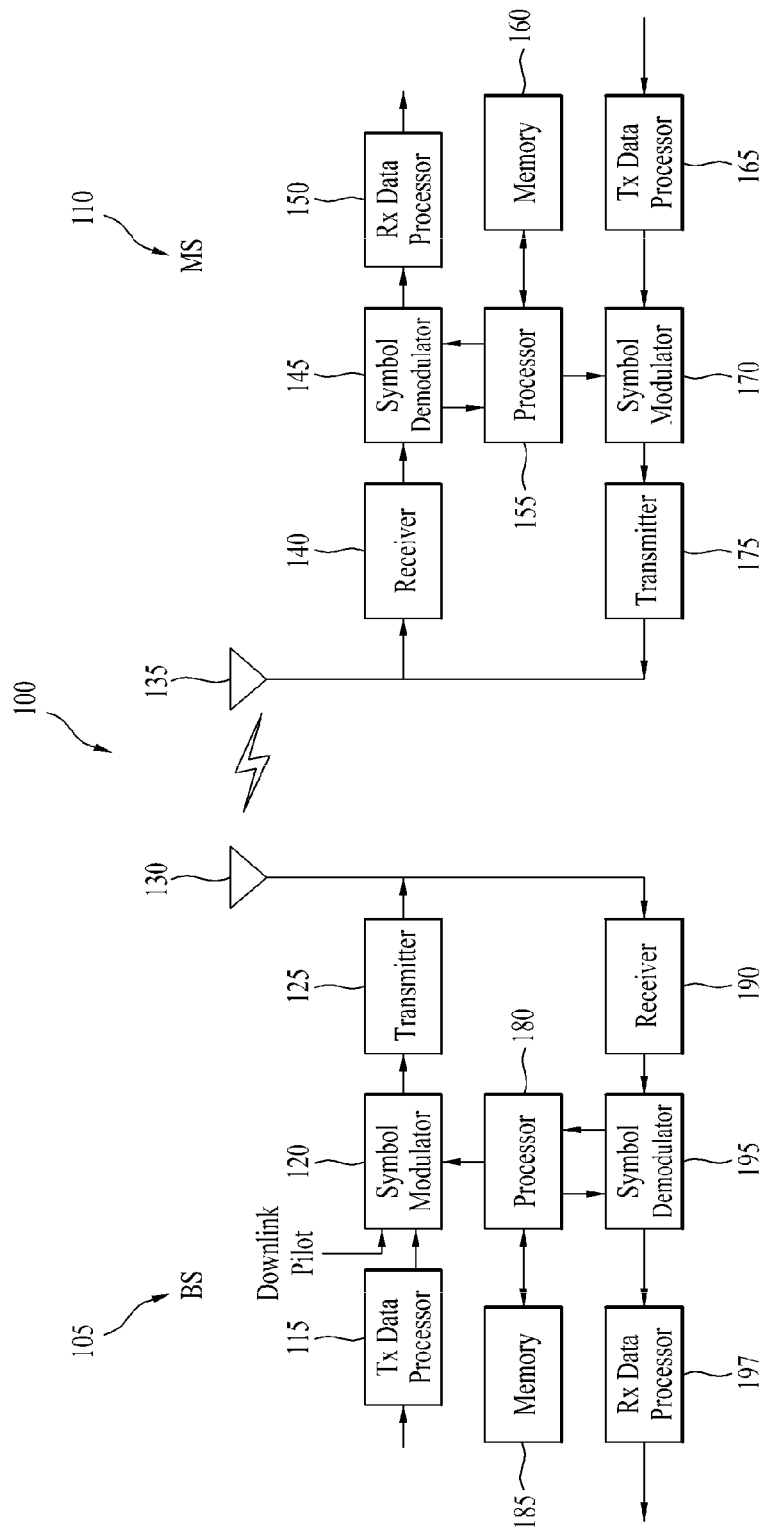
FIG. 1 is a block diagram illustrating a configuration of a base station 105 and a mobile station 110 in a wireless communication system 100.

FIG. 1 is a block diagram of a base station (BS) 105 and a mobile station (MS) 110 in a wireless communication system 100.

While one BS 105 and one MS 110 are shown in FIG. 1 to simplify the configuration of the wireless communication system 100, the wireless communication system 100 obviously may include a plurality of BSs and/or a plurality of MSs.

Referring to FIG. 1, the BS 105 may include a transmission (Tx) data processor 115, a symbol modulator 120, a transmitter 125, a Transmission/Reception (Tx/Rx) antenna 130, a processor 180, a memory 185, a receiver 190, a symbol demodulator 195, and a reception (Rx) data processor 197. The MS 110 may include a Tx data processor 165, a symbol modulator 170, a transmitter 175, a Tx/Rx antenna 135, a processor 155, a memory 160, a receiver 140, a symbol demodulator 145, and an Rx data processor 150. While the antennas 130 and 135 are each shown as a single antenna in the BS 105 and the MS 110, they include multiple antennas. Hence, the BS 105 and the MS 110 support a Multiple Input Multiple Output (MIMO) system, specifically both Single User-MIMO (SU-MIMO) and Multi User-MIMO (MU-MIMO) in the present invention.

On downlink, the Tx data processor 115 receives traffic data, processes the received traffic data through formatting, coding, interleaving, and modulation (i.e. symbol mapping), and thus outputs modulated symbols ("data symbols"). The symbol modulator 120 processes the data symbols received from the Tx data processor 115 and pilot symbols, thus producing a symbol stream.

More specifically, the symbol modulator 120 multiplexes the data symbols and the pilot symbols and transmits the multiplexed symbols to the transmitter 125. Each transmission symbol may be a data symbol, a pilot symbol or a null signal valMS. Pilot symbols may be transmitted successively during each symbol period. The pilot symbols may be FreqMSncy Division Multiplexing (FDM) symbols, Orthogonal FreqMSncy Division Multiplexing (OFDM) symbols, Time Division Multiplexing (TDM) symbols, or Code Division Multiplexing (CDM) symbols.

The transmitter 125 converts the symbol stream into one or more analog signals and generates a downlink signal suitable for transmission over a radio channel by additionally processing (e.g. amplifying, filtering, and freqMSncy-upconverting) the analog signals. The downlink signal is transmitted to the MS 110 through the antenna 130.

The MS 110 receives the downlink signal from the BS 105 through the antenna 135 and provides the received downlink signal to the receiver 140. The receiver 140 processes the downlink signal, for example, through filtering, amplification and freqMSncy downconversion and converts the processed downlink signal into digital samples. The symbol demodulator 145 demodulates received pilot symbols and outputs the demodulated pilot symbols to the processor 155 for use in channel estimation.

In addition, the symbol demodulator 145 receives a freqMSncy response estimate of the downlink from the processor 155 and acquires data symbol estimates (i.e. estimates of the transmitted data symbols) by demodulating the received data symbols using the freqMSncy response estimate. The Rx data processor 150 demodulates the data symbol estimates (i.e. performs symbol demapping), deinterleaves the demodulated data symbols, and decodes the deinterleaved data symbols, thereby recovering the traffic data transmitted by the BS 105.

The operations of the symbol demodulator 145 and the Rx data processor 150 are complementary to the operations of the symbol modulator 120 and the Tx data processor 115 of the BS 105.

On the uplink, in the MS 110, the Tx data processor 165 outputs data symbols by processing received traffic data. The symbol modulator 170 multiplexes the data symbols received from the Tx data processor 165 with pilot symbols, modulates the multiplexed symbols, and outputs a stream of the symbols to the transmitter 175. The transmitter 175 generates an uplink signal by processing the symbol stream and transmits the uplink signal to the BS 105 through the antenna 135.

The BS 105 receives the uplink signal from the MS 110 through the antenna 130. In the BS 105, the receiver 190 acquires digital samples by processing the uplink signal. The symbol demodulator 195 provides uplink pilot symbol estimates and uplink data symbol estimates by processing the digital samples. The Rx data processor 197 processes the data symbol estimates, thereby recovering the traffic data transmitted by the MS 110.

The processors 155 and 180 control (e.g. adjust, manage, etc.) operations of the MS 110 and the BS 105. The processors 155 and 180 may be connected respectively to the memories 160 and 185 that store program code and data. The memories 160 and 185 store an operating system, applications, and general files, in connection with the processors 155 and 180.

The processors 155 and 180 may also be called controllers, microcontrollers, microprocessors, or microcomputers. The processors 155 and 180 may be configured as hardware, firmware, software, or a combination thereof. When embodiments of the present invention are implemented using hardware, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) which are adapted to implement the present invention may be included in the processors 155 and 180.

On the other hand, if the embodiments of the present invention are implemented using firmware or software, the firmware or software may be configured to include a module, a procedure, a function, etc. which perform functions or operations according to the present invention. The firmware or software may be included in the processors 155 and 180, or stored in the memories 160 and 185 and invoked from the memories 160 and 185 by the processors 155 and 180.

The layers of radio interface protocols between an MS/BS and a wireless communication system (network) may be classified into Layers 1, 2 and 3 (L1, L2 and L3) based on the three lowest layers of the Open System Interconnection (OSI) model. A physical layer corresponds to L1 and provides an information transmission service on physical channels. A Radio Resource Control (RRC) layer corresponds to L3 and provides radio control resources between the MS and the network. The MS/BS and the network exchange RRC messages through the RRC layers.

Figure 2:
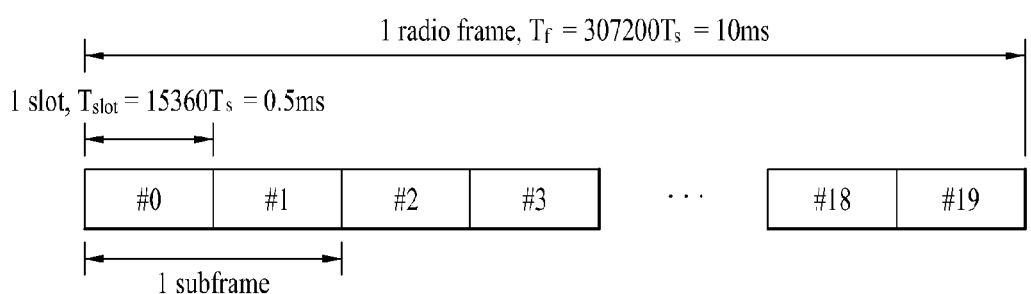
FIG. 2 illustrates the structure of a wireless frame used in a 3GPP LTE system which is an example of a mobile communication system.

FIG. 2 is a diagram illustrating a structure of a radio frame used in a 3GPP LTE system which is an example of a mobile communication system.

Referring to FIG. 2, one radio frame has a length of 10 ms (327200×Ts) and includes ten (10) subframes of equal size. Each subframe has a length of 1 ms and includes two slots. Each slot has a length of 0.5 ms (15360Ts). In this case, Ts represents sampling time, and is expressed by Ts=1/(15 kHz× 2048)=3.2552×10-8 (about 33 ns). The slot includes a plurality of orthogonal frequency division multiplexing (OFDM) symbols or single carrier-frequency division multiple access (SC-FDMA) symbols in a time domain, and includes a plurality of resource blocks (RBs) in a frequency domain.

In the LTE system, one resource block includes twelve (12) subcarriers×seven (or six) OFDM symbols or SC-FDMA symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols or SC-FDMA symbols included in the slot.

FIGS. 3(a) and 3(b) illustrate structures of downlink and uplink subframes in a 3GPP LTE system which is an example of a mobile communication system.

Referring to FIG. 3(a), one downlink subframe includes two slots in a time domain. A maximum of three OFDM symbols located at the front of the first slot within one downlink subframe correspond to a control region to which control channels are allocated. The other OFDM symbols correspond to a data region to which a physical downlink shared channel (PDSCH) is allocated.

Examples of downlink control channels used in the 3GPP LTE system include a Physical Control Format Indicator Channel (PCFICH), a Physical Downlink Control Channel (PDCCH), and a Physical Hybrid ARQ Indicator Channel (PHICH). The PCFICH transmitted from the first OFDM symbol of the subframe carries information on the number of OFDM symbols (that is, size of control region) used for transmission of the control channels within the subframe. The control information transmitted through the PDCCH will be referred to as downlink control information (DCI). The DCI includes uplink resource allocation information, downlink resource allocation information, and uplink transmission (Tx) power control command for random mobile station groups. The PHICH carries ACK/NACK (acknowledgement/negative-acknowledgement) signals in response to uplink HARQ (Hybrid Automatic Repeat Request). In other words, the ACK/NACK signal for the uplink data transmitted from the mobile station is transmitted on the PHICH.

Now, the PDCCH will be described.

The base station may transmit a resource allocation and transport format (this may be referred to as DL grant) of the PDSCH, resource allocation information (this may be referred to as UL grant) of the PUSCH, aggregation of transmission power control commands for individual mobile stations within a random mobile station group, and activity information of voice over Internet protocol (VoIP) through the PDCCH. A plurality of PDCCHs may be transmitted within the control region. The mobile station may monitor the plurality of PDCCHs. The PDCCH is configured by aggregation of one or a plurality of continuous control channel elements (CCEs). The PDCCH of one or an aggregation of several continuous CCEs may be transmitted through the control region after subblock interleaving. The CCE is a logical allocation unit used to provide the PDCCH with a coding rate based on radio channel status. The CCE corresponds to a plurality of resource element groups (REGs). The format of the PDCCH and the number of available bits of the PDCCH are determined depending on the correlation between the number of CCEs and a coding rate provided by the CCEs.

The control information transmitted through the PDCCH is referred to as downlink control information (DCI). The following Table 1 illustrates DCI based on a DCI format.

TABLE 1

| DCI format | Description |
|---|---|
| DCI format 0 | used for scheduling of PUSCH |
| DCI format 1 | used for scheduling of one PDSCH codeword |
| DCI format 1A | used for compact scheduling of one PDSCH codeword and random access procedure initiated by a PDCCH order |
| DCI format 1B | used for compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for transmission of TPC commands for PUCCH and PUSCH with 2-bit power adjustments |
| DCI format 3A | used for transmission of TPC commands for PUCCH and PUSCH with single bit power adjustments |

DCI format 0 represents uplink resource allocation information,
DCI formats 1 and 2 represent downlink resource allocation information, and
DCI formats 3 and 3A represent uplink transmit power control (TPC) command for random mobile station groups.

A method for mapping a resource for PDCCH transmission in a base station of the LTE system will be briefly described.

Generally, the base station may transmit scheduling allocation information and other control information through the PDCCH. The physical control channel may be transmitted to one aggregation or a plurality of continuous control channel elements (CCEs). One CCE includes nine resource element groups (REGs). The number of resource element groups (RBGs) which are not allocated to a physical control format indicator channel (PCFICH) or a physical hybrid automatic repeat request indicator channel is NREG. The CCE available in the system are from 0 to $N_{CCE-1}$ (in this case, $N_{CCE}=[N_{REG}/9]$). The PDCCH supports multiple formats as expressed in Table 2 below. One PDCCH that includes n continuous CCEs starts from a CCE that performs i mod n=0 (in this case, i is a CCE number). The multiple PDCCHs may be transmitted to one subframe.

TABLE 2

| PDCCH format | No. of CCEs | No. of REGs | No. of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 2, the base station may determine a PDCCH format depending on how many regions control information are transmitted. The mobile station may reduce overhead by reading out control information in a unit of CCE. Likewise, the relay node may read out the control information in a unit of R-CCE. In the LTE-A system, a resource element (RE) may be mapped in a unit of relay-control channel element (R-CCE) to transmit R-PDCCH for a random relay node.

Referring to FIG. 3(b), the uplink subframe may be divided into a control region and a data region on a frequency domain. A physical uplink control channel (PUCCH), which carries uplink control information, is allocated to the control region. A physical uplink shared channel (PUSCH), which carries user data, is allocated to the data region. In order to maintain single carrier features, one mobile station does not transmit the PUCCH and the PUSCH at the same time. The PUCCH for one mobile station is allocated to a resource block (RB) pair at one subframe. Resource blocks (RBs) belonging to the RB pair occupy different subcarriers for two slots. The RB pair allocated to the PUCCH is subjected to frequency hopping at a slot boundary.

Figure 4:
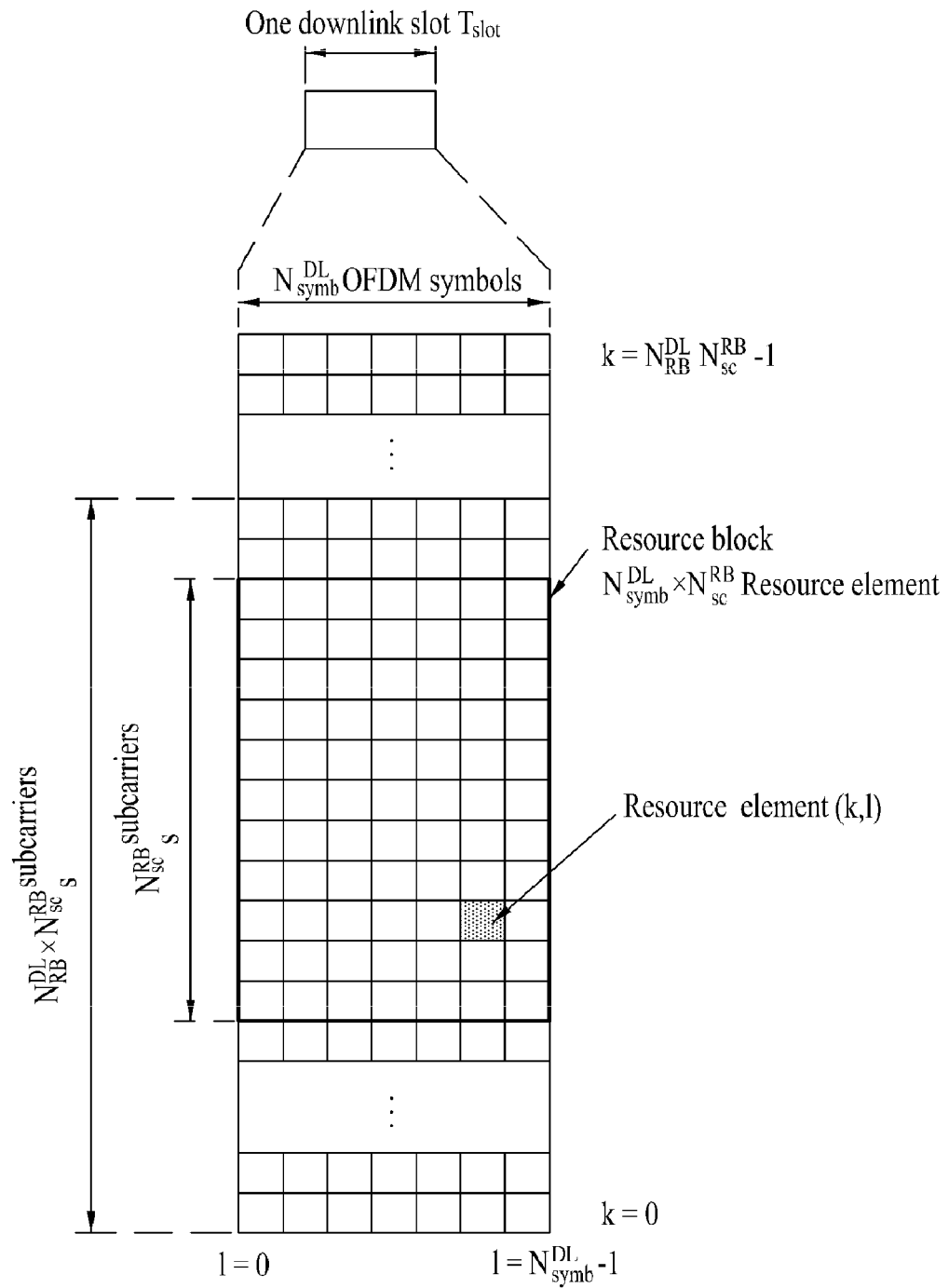
FIG. 4 illustrates a time-frequency resource grid structure of the downlink used in the present invention.

FIG. 4 is a diagram illustrating a time-frequency resource grid structure of a downlink slot used in the present invention.

A downlink signal transmitted from each slot may be expressed by a resource grid, which includes $N_{RB}^{DL} \times N_{SC}^{RB}$ subcarriers and $N_{symb}^{DL}$ OFDM (orthogonal frequency division multiplexing) symbols. In this case, $N_{RB}^{DL}$ represents the number of resource blocks (RBs) in downlink, $N_{sc}^{RB}$ represents the number of subcarriers that constitute one resource block (RB), and $N_{symb}^{DL}$ represents the number of OFDM symbols at one downlink slot. The size of $N_{RB}^{DL}$ may be varied depending on a downlink transmission bandwidth configured within a cell and should satisfy $N_{RB}^{min,DL} \leq N_{RB}^{DL} \leq N_{RB}^{max,DL}$. In this case, $N_{RB}^{min},DL$ is the smallest downlink bandwidth supported by the wireless communication system, and $N_{RB}^{max},DL$ is the greatest downlink bandwidth supported by the wireless communication system. Although $N_{RB}^{min}, DL=6$ and $N_{RB}^{max}, DL=110$ may be provided, the present invention is not limited to this example. The number of OFDM symbols included in one slot may be varied depending on cyclic prefix (CP) length and subcarrier interval. In case of MIMO antenna transmission, one resource grid may be defined per antenna port.

Each element within the resource grid for each antenna port is referred to as a resource element (RE), and is uniquely identified by a pair of indexes (k,l) within the slot. In this case, k is an index in the frequency domain, l is an index in the time domain. Also, k has any one value of $0, \ldots, N_{RB}^{DL}N_{SC}^{RB}-1$ and l has any one value of $0, \ldots, N_{symb}^{DL-1}$.

The resource block shown in FIG. 4 is used to describe the mapping relation between a physical channel and resource elements. The RB may be divided into a physical resource block (PRB) and a virtual resource block (VRB). The one physical resource block is defined by $N_{symb}^{DL}$ continuous OFDM symbols in the time domain and $N_{sc}^{RB}$ continuous subcarriers in the frequency domain. In this case, $N_{symb}^{DL}$ and $N_{sc}^{RB}$ may be the previously defined values. For example, $N_{symb}^{DL}$ and $N_{sc}^{RB}$ may be given as illustrated in Table 3 below. Accordingly, one PRB includes $N_{symb}^{DL} \times N_{sc}^{RB}$ resource elements. One PRB corresponds to, but is not limited to, one slot in the time domain, and corresponds to, but is not limited to, 180 kHz in the frequency domain.

TABLE 3

| Configuration | $N_{SC}^{RB}$ | $N_{symb}^{DL}$ |
|---|---|---|
| Normal cyclic prefix Δf = 15 kHz | 12 | 7 |
| Extended cyclic prefix Δf = 15 kHz | 12 | 6 |
| Extended cyclic prefix Δf = 7.5 kHz | 24 | 3 |

The PRB has values from 0 to $N_{RB}^{DL-1}$ in the frequency domain. The relation between the physical resource block number $n_{PRB}$ and resource elements (k,l) within one slot satisfies $$n_{PRB} = \left\lfloor \frac{k}{N_{sc}^{RB}} \right\rfloor.$$

The virtual resource block (VRB) has the same size as that of the physical resource block (PRB). The VRB may be divided into a localized virtual resource block (LVRB) and a distributed virtual resource block (DVRB). For each VRB, a pair of VRBs in two slots within one subframe are allocated together with a single virtual resource block number $n_{VRB}$.

The VRB may have the same size as that of the PRB. Two types of VRBs are defined, wherein the first type is the localized VRB (LVRB) and the second type is the distributed VRB (DVRB). For each VRB, a pair of VRBs is allocated to two slots of one subframe together with a single VRB index (hereinafter, referred to as VRB number). In other words, $N_{RB}^{DL}$ number of VRBs belonging to the first of two slots constituting one subframe are allocated with any one index of 0 to $N_{RB}^{DL-1}$, and $N_{RB}^{DL}$ number of VRBs belonging to the second slot are allocated any one index of 0 to $N_{RB}^{DL-1}$.

Hereinafter, a procedure of transmitting a PDCCH from a base station to a mobile station in an LTE system will be described.

The base station determines a PDCCH format depending on the DCI transmitted to the mobile station, and attaches cyclic redundancy check (CRC) to the control information. The CRC is masked with a unique identifier (for example, radio network temporary identifier (RNTI)) depending on owner of the PDCCH or usage of the PDCCH. If the PDCCH is for a specific mobile station, cell-RNTI (C-RNTI) of the corresponding mobile station may be masked with the CRC. If the PDCCH is for a paging message, a paging indicator identifier (P-RNTI) may be masked with the CRC. If the PDCCH is for system information, system information identifier and system information RNTI (SI-RNTI) may be masked with the CRC. In order to indicate a random access response which is the response to transmission of a random access preamble of the mobile station, a random access RNTI (RA-RNTI) may be masked with the CRC. The following Table 4 illustrates an example of identifiers masked with the PDCCH and/or R-PDCCH.

TABLE 4

| Type | Identifier | Description |
|---|---|---|
| MS-specific | C-RNTI | used for MS corresponding to the C-RNTI |
| Common | P-RNTI | used for paging message |
|  | SI-RNTI | used for system information (can be differentiated according to type of system information) |
|  | RA-RNTI | used for random access response (can be differentiated according to subframe, or PRACH slot index for MS PRACH transmission) |
|  | TPC-RNTI | used for uplink transmit power control command (can be differentiated according to index of MS TPC group) |

If the C-RNTI is used, the PDCCH carries control information for the corresponding specific mobile station. If another RNTI is used, the PDCCH carries common control information received by all mobile stations or a plurality of mobile stations within the cell. The base station generates coded data by performing channel coding for the DCI to which CRC is added. And, the base station performs rate matching based on the number of CCEs allocated to PDCCH, R-PDCCH format. Afterwards, the base station generates modulation symbols by modulating the coded data, and maps the modulation symbols to physical resource elements.

In IEEE 802.16 system, a station identifier (STID) is used as a unique identifier of a mobile station for transmission of control information for a specific mobile station (MS) instead of a C-RNTI. The STID is an identifier, which is allocated to each MS by the base station (BS) for identifying the MS, and the size thereof is 12 bits. The BS allocates the STID to each terminal (or MS) which enters the network. Further, the base station may allocate a new STID to a mobile station which reenters the network. The temporary STID (TSTID) is an identifier which is temporarily used to protect the mapping between STIDs used after network entrance. The base station may allocate the TSTID in the STID number space, and transmit the allocated TSTID. Here, the base station may transmit the TSTID through the AAI-RNG-RSP, which is the ranging response message, during the initial ranging. During the registration procedure, the base station may transmit the STID to the mobile station through the encrypted AAI-REG-RSP. The BS checks and recognizes the successful completion of the registration procedure by the MS, and cancels the TSTID.

Likewise, the base station allocates the STID to the mobile station (or user equipment) which enters the network, and in the current mobile communication system, the STID needs to be allocated to the existing human type communication (HTC) devices as well as many additional M2M mobile stations (or machine type communication (MTC) terminals). Here, the application type of the M2M terminal (or M2M device) will be briefly considered.

Devices, which communicate in M2M method, may be called as various expressions such as an M2M terminal, an M2M communication terminal, an MTC terminal, etc. The number of M2M devices in a network will gradually increase as the number of machine application types increases. Such machine application types that are under discussion include, but are not limited to, (1) security, (2) public safety, (3) tracking and tracing, (4) payment, (5) healthcare, (6) remote maintenance and control, (7) metering, (8) consumer devices, (9) Point Of Sale (POS) and fleet management in the security-related application market, (10) communication between vending machines, (11) a smart meter for automatically measuring the amount of consumed heat or electricity, measuring an operating time of construction equipment and facilities, and remote monitoring machines and facilities, and (12) surveillance video communication of a surveillance camera, and various other machine application types are also under discussion.

As the number of machine application types increases, the number of M2M devices will significantly increase compared to the number of general mobile communication devices. Hence, when all of these devices individually perform communication with the base station, severe load may be given to the wireless interface, and a collision may occur according to the scheduling method of the base station.

Further, the base station of the mobile communication system may also need to allocate the STID to the M2M terminal. However, it is impossible to support all rapidly increasing M2M terminals with the STID of a size of 12 bits in the existing IEEE 802.16m system. Hence, the present invention suggests a method for allocating a STID for supporting massive devices in one cell and a method for transmitting a control channel related therewith in a wireless communication system.

The description below is based on a wireless communication system of an IEEE 802.16 type, but it is possible to apply the description to another wireless communication system (e.g., 3GPP type) of the same kind. Further, the description may be applied to M2M terminals (or MTC terminals as well as HTC terminals or other kinds of terminals in the same manner.

The existing wireless communication system has been designed focusing on optimizing communication with the HTC devices. However, a method for supporting communication between machines without intervention of a person in a wireless communication network is under discussion. Particularly, when the M2M terminal is introduced, there is a high chance that a large number of application specific M2M terminals are introduced, and thus unlike the case in which only the existing HTC devices are supported, the terminal IDs, which are allocated for terminal identification in the base station, i.e., the STIDs (in the case of 3GPP LTE type, C-RNTI), may become insufficient.

To this end, the method for supporting identification of a large amount of devices with respect to the bit size for the STID may not be efficient because it requires significant modifications for the PHY/MAC structures related with the STID of the existing system. Hence, the method for increasing the STID bit size is not discussed here, and the present invention suggests an efficient STID allocation method for a large number of M2M terminals which are additionally introduced without an impact on HTC devices while maintaining the bit size of the existing STID. In particular, the present invention suggests a method for sharing one STID by grouping a plurality of terminals. The term terminal (or mobile station) may include both an M2M terminal and a HTC terminal.

<Downlink Issue According to STID Sharing of a Plurality of Mobile Stations>

Figure 5:
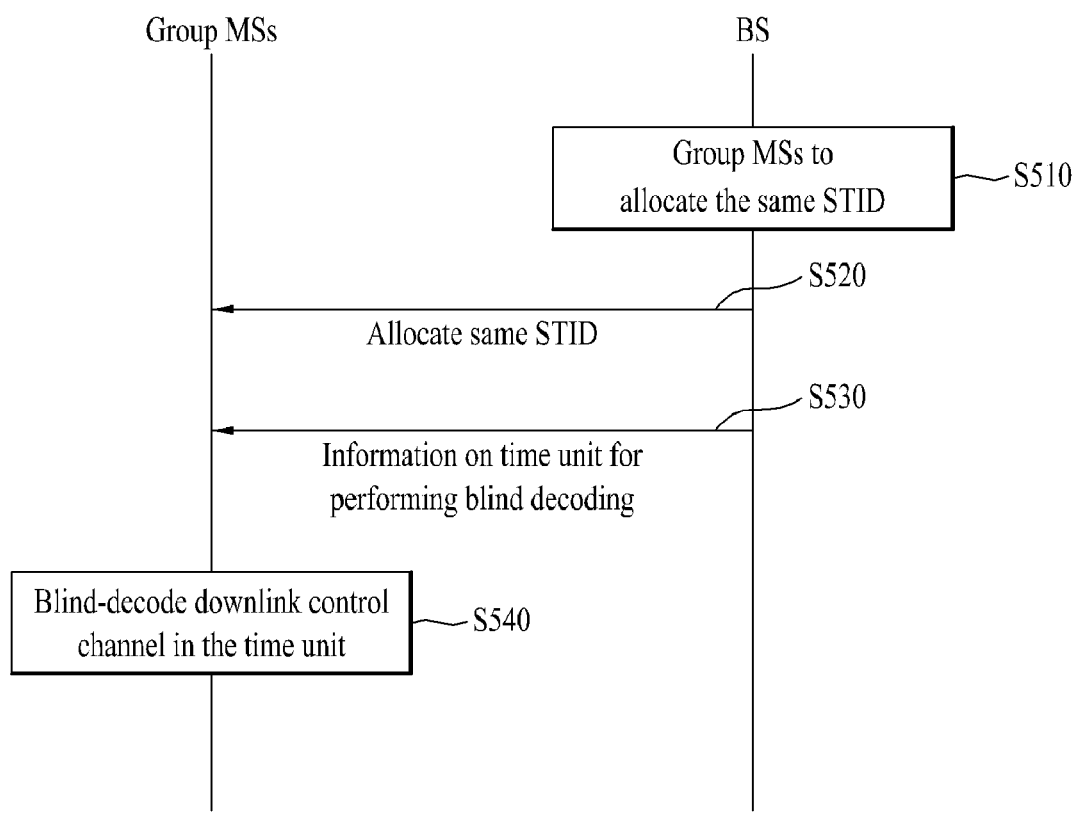
FIG. 5 illustrates a process for receiving downlink signals by a group of terminals which share the same STID according to an exemplary embodiment of the present invention.

FIG. 5 illustrates a process for receiving downlink signals by a group of terminals (mobile stations) which share the same STID according to an exemplary embodiment of the present invention.

Referring to FIG. 5, the base station may group mobile stations for allocating the same STID (S510). In the process in which a plurality of mobile stations (MSs) enter the network, the base station may allocate and transmit one same STID to the group MSs (S520). Hence, a plurality of grouped mobile stations share the same STID. For example, in the case of IEEE 802.16 system, the STID is composed of 12 bits, and the base station may group N mobile stations and allocate one same STID composed of 12 bits to N mobile stations. Likewise, if the base station allocates the same STID to the plurality of grouped mobile stations, in the case of A-MAP, 3GPP of IEEE 802.16 system, transmission of a downlink control channel such as a PDCCH may not be appropriately performed. For example, when transmitting a downlink control channel, the base station transmits the channel after CRC-masking the STID of the mobile station (MS) for the MS identification. However, if the base station allocates the same STID to group MSs and transmits the downlink control channel CRC-masked by one same STID to group MSs that share the STID, each of the grouped MSs cannot determine which MS the base station has transmitted control information for in the control channel. In order to solve this problem, the present invention suggests methods described below.

1. STID Sharing of Group Mobile Stations in a Time Division Scheme

As a method to solve the above problem, according to this method the grouping mobile stations, to which the base station has allocated the same STID, use the same STID in a time division mode. That is, the base station may transmit time domain (or time unit) information for performing blind decoding for receiving the downlink control channel to each of the group MSs (S530).

For example, it is assumed that the base station has allocated the same STID to four random MSs. In this case, the base station may limit the subframe for which each of the four MSs performs blind decoding for the downlink control channel. That is, the base station allocates the same STID to MS A, MS B, MS C and MS D, and MS A receives the downlink control channel through only the first subframe of each frame, MS B is set to perform blind decoding of the downlink control channel through the STID in only the second subframe, and MS C and MS D are set to perform blind decoding of the downlink control channel through the STID in the third and fourth subframes, respectively.

To this end, the base station needs to transmit information about the time unit (e.g., the subframe unit) in which each MS may use the STID for blind decoding of the downlink control channel. Here, the base station may inform each MS of information about the subframe by directly signaling the subframe index or in a bitmap indication method on each subframe. Further, the base station may inform each MS of information about the subframe in a method of transmitting the table index within a predetermined table. Here, the table may be expressed as various combinations of subframe information which would be blind-decoded by each MS through the STID, and such an example may be shown in Table 5 below.

TABLE 5

|  | MS A | MS B | MS C | MS D |
|---|---|---|---|---|
| Index 0 | First subframe | Second subframe | Third subframe | Fourth subframe |
| Index 1 | Second subframe | Third subframe | Fourth subframe | First subframe |
| Index 2 | Third subframe | Fourth subframe | First subframe | Second subframe |
| Index 3 | Fourth subframe | First subframe | Second subframe | Third subframe |

The base station may select index 0 from the predefined table, and notify each of the group MSs of the selection. Such information, which is allocated to the MS for each index, may be notified by the base station to the MSs by upper layer signaling, etc. Hereinafter, for the convenience of explanation, it is assumed that the base station signals index 0.

The processor 155 of each MS performs blind decoding for the downlink control channel in the allocated time unit (e.g., the allocated subframe) using the allocated STID (S540). However, the base station can transmit the downlink data channel, not the downlink control channel, through a subframe other than the subframe. For example, if MS A is allocated the first subframe, the base station may transmit the downlink data channel to MS A in the remaining subframes except the first subframe. To this end, when transmitting a DL grant, which is downlink resource allocation information, to MS A through the downlink control channel of the subframe (first subframe from the perspective of MS A), the base station may transmit indication information about the subframe, in which the downlink data is transmitted, to MS A. Here, the base station may transmit indication information about the subframe, in which the downlink data channel is transmitted, in a method of an offset about the subframe (first subframe from the perspective of MS A) in which the DL grant is transmitted, or may directly signal the subframe index.

Further, the base station may support the non-contiguous multi-TTI transmission with respect to the downlink data channel transmission. To this end, the base station may transmit the DL grant control information on the data channel to be transmitted through each separate subframe, through different A-MAP-IEs within the subframe through separate coding (i.e., there may be a plurality of A-MAP-IEs for DL grant transmission), or the information may be transmitted in a joint coding method in which the transmission is performed through one DL grant A-MAP IE.

Likewise, the concept used in the DL grant transmission method for downlink data transmission may also be applied to the UL grant transmission for uplink data channel transmission in which transmission is performed through the downlink control channel of the subframe. That is, the information area, which directly indicates the subframe for the uplink data channel transmission, may be included in the UL grant A-MAP-IE which is transmitted through the downlink control channel of the subframe whose exclusive use on the shared STID is guaranteed. Further, the non-continuous multi TTI transmission may also be supported. To this end, the base station may transmit the UL grant A-MAP-IE for the uplink data channel which transmits each uplink subframe through separate coding as in the case of the downlink, the UL grant A-MAP-IE is transmitted by separate coding scheme or through joint coding scheme.

In the description above, the time division unit for the STID shared by a plurality of MSs has been explained using an example of the subframe unit, but this may also be applied to other time units such as the frame unit and the superframe unit, etc. That is, in the case in which MSs within the group share the same STID, subframes, in which blind decoding for the downlink control channel may be performed using the STID for each MS within one frame, have been limited, but the limited unit of the time domain, which may use the STID for each MS, may also become the frame unit, the superframe unit, etc.

When allocating the STID to the group MSs, the base station may include and transmit information for indicating the frame or the superframe in which the STID may be exclusively used. To this end, as an exemplary embodiment for allocating the frame or superframe in which the base station exclusively uses the STID, the base station may signal to each MS the information on the frame or the superframe to perform blind decoding in the form of an offset value for the period along with the period of the frame or the superframe in which each MS may exclusively use the STID.

For example, it is assumed that the base station has allowed MS A to use the STID with the four frame or four superframe period. Further, it is assumed that the base station has made MS A use the STID in the second frame or the second superframe among repeated four frames or four superframes. Then the base station may signal the period value 4 and the offset value 1 (that is, the second frame or second superframe index mod 4=1) to MS A. The processor 155 of the MS may perform blind decoding in the frame or the superframe based on the period value 4 and the offset value 1.

Further, the frame or the superframe, which may exclusively use the STID based on the fixed period, i.e., a fixed number of frames or superframes, may be transmitted to each MS in a bitmap method, or as explained above, a random table index may be selected from a predetermined table and then be transmitted to each MS. Then the processor 155 of each MS may blind-decode the downlink control channel in the frame or superframe corresponding to predefined table index (S540).

Further, the above described time division may be applied to all of the cases in which the time is divided in one or more frame or superframe group units, one or more subframe group units, or one or more symbol group units. The above described method basically explains the time division sharing of the STID for the A-MAP-IE for the DL grant and UL grant, that is, the assignment A-MAP-IE for transmitting scheduling information, but the same concept may be applied to all downlink control channels (e.g., HARQ feedback A-MAP-IE, etc.) in which the STID is used. Further, the same scheme may be applied to the MAC management message which requires the instruction on an individual mobile station (MS) for the MS group which shares the same STID, among MAC management messages transmitted through the data channel.

Further, the above described subframe unit time division information, frame unit time division information, or other time unit based time division information may be transmitted by base station to each MS through the AAI-REG-RSP message which is communicated at the time of the MS's network entrance, or may be transmitted to each MS through the AAI-HO-CMD message in which STID may be allocated in the target base station at the time of handover. Further, a new type of MAC management message for transmitting the same may be defined, and the base station transmit the time division information for the STID shared between group MSs to each MS with the newly defined MAC management message. Further, the time division information for the STID shared between group MSs is not fixed, and may be updated by the request of the base station or the MS.

2. STID Sharing through ACID Division of Group MSs

As a way to solve the above problem, the base station allows the group MSs, which use the same STID, to exclusively use the ACID. That is, similarly to the above explained time division method, the base station may allow the group MSs to exclusively use the STID only in a specific ACID (in the case of LTE-A, the HARQ process ID). Here, the ACID represents a downlink HARQ channel identifier.

To this end, the base station may inform each MS within the group, which uses the same STID, of the ACID allocation information. For example, if there are 8 ACIDs, the base station may allocate ACID 0, ACID 1, . . . , ACID 7 sequentially to each MS by grouping a maximum of 8 MSs. The base station may give information to the MSs within the group in a bitmap method for each ACID for each MS within the group using the STID, or a specific table index may be selected within a predetermined table (the ACID index is defined in advance for each MS), and may then be signaled. Thereafter, the processor 155 of the MS performs blind decoding of the downlink control channel only in the time unit (e.g., the subframe) in which the ACID comes down to the processor.

Further, the base station may transmit ACID allocation information to each MS within the group through the AAI-REG-RSP message, which is communicated at the time of the MS's network entrance, or may be transmit the information to the group MSs through the AAI-HO-CMD message by which the STID may be allocated in the target base station at the time of the handover. Further, a new type of MAC management message for transmitting the information is defined, and the information may be transmitted to the group MSs through the newly defined MAC management message. The ACID allocation for the STID shared between the group MSs may be updated by the request of the base station or the MS.

3. STID Sharing through Frequency Division of Group MSs

Figure 6:
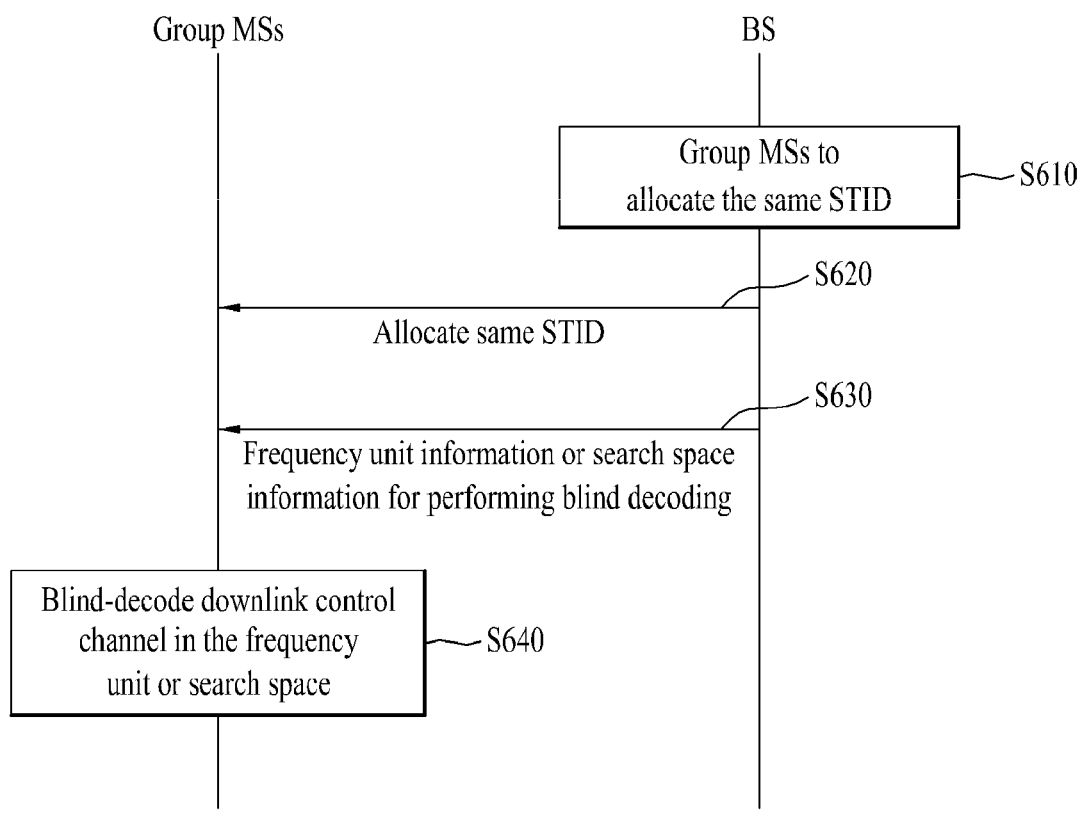
FIG. 6 illustrates a process for receiving downlink signals by a group of terminals which share the same STID according to another exemplary embodiment of the present invention.

FIG. 6 illustrates a process for receiving downlink signals by a group of terminals (MSs) which share the same STID according to another exemplary embodiment of the present invention.

Referring to FIG. 6, as explained with reference to FIG. 5, the base station may group MSs to allocate the same STID (S610). In the process of the network entrance of a plurality of terminals, the base station may allocate and transmit one same STID to group MSs (S620). Hence, a plurality of grouped MSs share the same STID.

As a way of solving the problem, MSs, which have been grouped to use the same STID, use the same STID in a frequency division method. In FIG. 5, the MSs, which share the same STID, exclusively use the STID only in a specific frequency as in the time division method explained with reference to FIG. 5. The frequency division unit for the STID shared by the group MSs may be the logical resource unit (LRU), the physical resource unit PRU, physical resource block (PRB), virtual resource block (VRB), etc., or may be divided into a certain size subband unit composed of one or more LRU, PRU, PRB and VRB groups. In a system that supports a multi-carrier as in a 3GPP LTE-A system, if a specific cell is composed of a multi carrier, the unit may become one component carrier unit.

The base station may allocate the frequency unit (or frequency area), in which the MSs within the group may perform blind decoding, and transmit the allocated frequency unit to each MS (S620). Then the processor of the MS blind-decodes the downlink control channel using the STID within only the limited frequency domain corresponding to the processor 155 (S640). Further, the base station may allow the STID to be shared by transmitting the MAC management message which requires the instruction on the individual MS among the MS group which shares the same STID among the MAC management messages transmitted through the downlink data channel.

Similarly to the STID sharing method in the time division scheme, the frequency domain restriction for the frequency division may be achieved by a bitmap method or by selecting a specific table index within a predetermined table (e.g., including frequency domain information allocated in advance for each MS) and signaling the selected index.

Further, the base station may transmit the frequency division information through the AAI-REG-RSP message at the time of the MS's network entrance. Further, the base station may transmit the frequency division information through the AAI-REG-RSP message at the time of the MS's network entrance, and may transmit the information through the AAI-HO-CMD message in which the STID may be allocated in the target base station at the time of the handover. Further, the new type MAC management message may be defined, and the information may be transmitted through the new MAC management message. The frequency division information for the STID shared between group MSs through the MAC management message may be updated by the request of the base station or the MS.

4. STID Sharing Through the Search Space Division Scheme

As a way for solving the above problem, the base station performs division between MSs in the search space in which blind decoding for the downlink control channel is performed using the shared STID. That is, as the base station separates the search space in which the group MSs, to which the same STID has been allocated, would perform blind decoding through the STID, efficient STID sharing may be achieved. The base station may respectively transmit to group MSs search space to be blind decoded through the shared STID (S630).

The base station may evenly divide the search space according to the number of grouped MSs. For example, when four MSs share the same STID, the base station may divide the search space into four divisions according to the size of the search space of the subframe for a search. To this end, when allocating the STID, the base station may signal the number of MSs, which share the STID, to each MS, and the search space of each subframe is evenly divided according to the number of MSs. Among such evenly divided search space, the search space used by an individual MS may be signaled by the base station along with the number of group MSs, which use the same STID in an offset method. When four MSs share the STID, the base station may signal an offset value along with the number of MSs so that MS A may use the first search space among the four divisions of the search space, and MS B, MS C and MS D may respectively use the second, third and fourth search spaces. The base station may partition the search space in logical control channel element (CCE) units, etc.

The base station may transmit search space division information to each MS within the group through the AAI-REG-RSP message which is communicated at the time of the MS's network entrance, or may be transmitted to each MS through the AAI-HO-CMD message in which STID may be allocated in the target base station at the time of handover. Further, a new type of MAC management message for transmitting the same may be defined, and the base station may transmit the time division information for the STID shared between group MSs to each MS with the newly defined MAC management message. Further, the time division information for the STID shared between group MSs may be updated by the request of the base station or the MS.

<Uplink Issue According to STID Sharing>

In the above, a method for solving the problem at the downlink transmission according to the STID sharing has been suggested according to the STID sharing centering on the downlink control channel. Likewise, as a plurality of MSs shares the same STID, even when transmitting the uplink, the base station may not be able to identify the MS for uplink transmission. Hence, there is a need for solution to the uplink transmission.

In particular, there is a need for a solution so that the base station may identify the MS by which the bandwidth request (BR) has been transmitted from the MS group which shares the same STID. The bandwidth request is a method used by MSs so as to inform the base station of the fact that the MSs need uplink bandwidth allocation. In a general wideband wireless connection system, a method for requesting bandwidth may be divided into a basic request method and a random access request method. According to the basic request method, the MS requests uplink bandwidth allocation by a unicast by the BS's polling. Further, the base station may request the uplink bandwidth by the piggyback on the remaining area of the bandwidth which has been already allocated from the base station. The random access request method is a contention based method in which multiple MSs competitively transmit a bandwidth request message through one uplink channel, and is allocated the uplink bandwidth.

In IEEE 802.16m system, an example of a mobile communication system, the mobile station generates a seed sequence of a code using the STID, a unique identifier, so as to distinguish the MS from other MSs when transmitting the content based bandwidth request. However, as group MSs share the STID, the seed sequence of the code generated by the group MSs becomes non-unique, and the method for solving this problem is described below.

Figure 7:
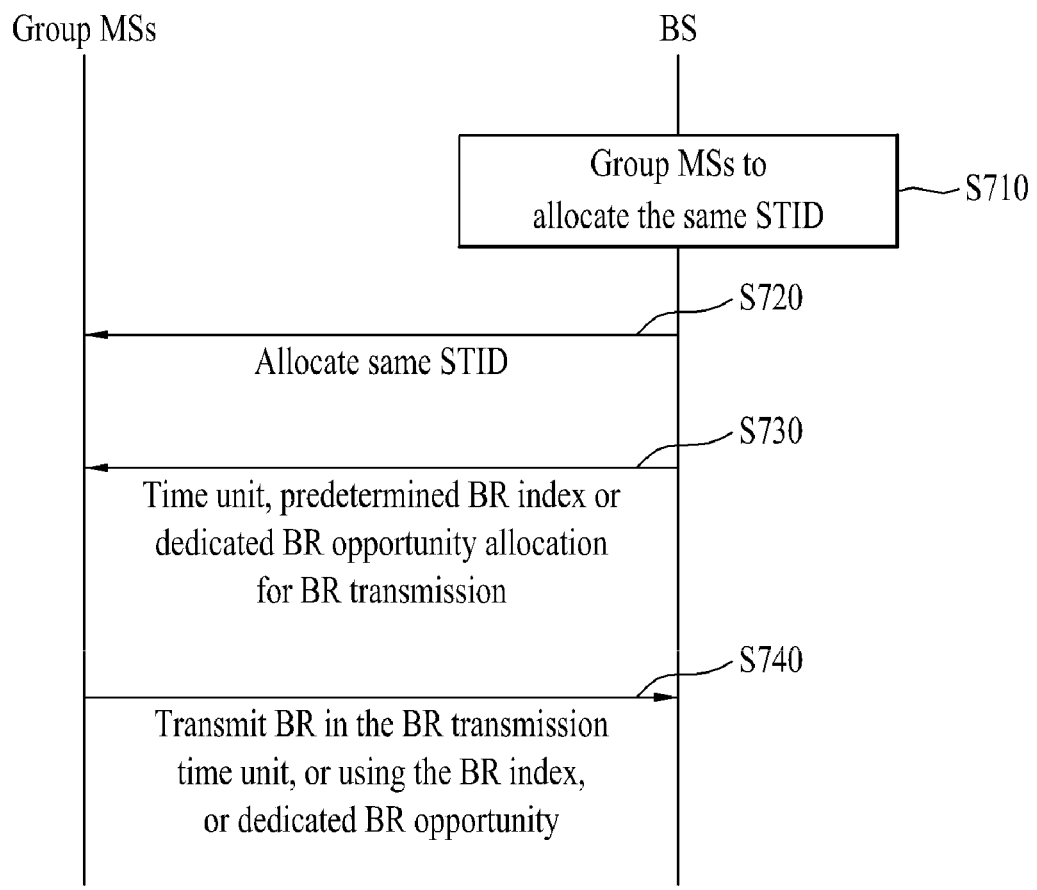
FIG. 7 illustrates a process for transmitting a bandwidth request (BR) by a group of terminals which share the same STID according to another exemplary embodiment of the present invention.

FIG. 7 illustrates a process for transmitting a bandwidth request (BR) by a group of terminals (mobile stations) which share the same STID according to another exemplary embodiment of the present invention.

Referring to FIG. 7, as described in FIGS. 5 and 6, the base station may group mobile stations to share the same STID (S710). In the network entrance process of a plurality of mobile stations, the base station may allocate one same STID to the group MSs and transmit the allocated STID (S720). The plurality of grouped mobile stations share the same STID.

1. Bandwidth Request (BR) Transmission of a Time Division Scheme

The base station may partition the bandwidth request transmission time which may be transmitted by each mobile station within the group. That is, the base station limit the time for which each mobile station within the group requests the bandwidth. The base station allocates the bandwidth request transmission time for each MS, and may notify each MS of the allocated time (S730). At this time, the bandwidth request (BR) time division of the base station may be partitioned in the same manner in the uplink time unit (for example, the subframe unit, frame unit and superframe unit). Thereafter, the terminal may transmit a bandwidth request in the bandwidth request transmission time unit (S740). Then, based on the time information on which the bandwidth request has been transmitted, the base station may identify which MS within the group has transmitted the bandwidth request.

Such a bandwidth request time division method may be performed implicitly without additional signaling based on the time division signaling for the above described downlink, or the base station may explicitly signal the information on the allocated bandwidth request transmission time unit independently to each MS within the group. In the case in which the base station explicitly performs signaling, the bandwidth request transmission time division information may be signaled in a bitmap method or in a method that gives information of the table index value from a predefined table.

2. Predefined Bandwidth Request (BR) Index Based Division

In this case, the base station identifies the mobile station by dividing the index (e.g., a size of 4 bits) of the bandwidth request which may be transmitted by each mobile station. That is, the base station limits the bandwidth request index used when each mobile station transmits the bandwidth request. Generally, the bandwidth request index is a value used to inform the base station of the information on the size of the uplink data to be transmitted by the MS at the time of a bandwidth request. However, the base station may use the "predetermined bandwidth request index" information area of the quick access message included in the bandwidth request (BR) in order to indicate an individual Ms within the MS group which shares the same STID.

Hence, the base station may define or allocate the bandwidth index value for each MS within the group in advance. Further, the base station may transmit the bandwidth request index value allocated to each MS within the group (S730). Thereafter, the MS transmits the bandwidth request index value to the base station at the time of the bandwidth request transmission (S740). Then the base station may respectively identify MSs within the group which have transmitted the bandwidth request, on the basis of the bandwidth request index value.

M2M mobile stations mostly transmit uplink data of a small size (for example, 140 bytes), and thus the "predetermined bandwidth request index value" may be used to distinguish the bandwidth request transmission of the MS within the group, not to provide information on the uplink data size. Hence, preferably, the HTC MS may use the "predetermined bandwidth request index value" to provide information on the uplink data size for the bandwidth request, and the M2M MS may use the "predetermined bandwidth request index value" to distinguish the bandwidth request transmission, but the present invention is not limited thereto.

Likewise, for example, the base station may distinguish a maximum of 16 mobile stations, which use the same STID, through the bandwidth request index value information area of a size of 4 bits. The bandwidth request index value, which is transmitted by the base station to the MS within the group, may be transmitted to each MS through the AAI-REG-RSP message which is communicated at the time of the MS's network entrance, or may also be transmitted through the AAI-HO-CMD message in which the STID may be allocated in the target base station at the time of the handover. Further, this may be transmitted through the new management message by defining a new type MAC management message. The bandwidth request index value information, which is shared between group MSs through the MAC management message, may be updated by the request of the base station or the MS.

3. Signaling of Dedicated Uplink Resource Allocation Information

If the base station receives the bandwidth request signal from each MS within the group based on the shared STID, the base station transmits the UL grant, which is the uplink resource allocation information, to all group MSs which share the STID. However, at this time, the base station may identify from each MS the uplink data is transmitted, by separating the uplink data channel resources allocated through the UL grant for each MS.

Alternatively, in order to prevent the waste of resources of the uplink data channel, the base station allocates the same uplink data channel resource through the UL grant, and the MAC header area of the data is set to include different identifiers for each MS among the group MSs which use the same STID. The unique identifier of the group MSs within the MAC header area may be transmitted by the base station to each MS through the AAI-REG-RSP message which is communicated by the base station at the time of the MS's network entrance, may also be transmitted through the AAI-HO-CMD in which the STID may be allocated in the target base station at the time of the handover. Further, this may be transmitted through a new MAC management message by defining a new type MAC management message. The unique identifier within the MAC header, which is shared between group MSs through the MAC management message, may be updated by the request of the base station or the MS.

4. Bandwidth Request Opportunity Based Division

In IEEE 802.16m system, an example of a wireless communication system, generally one bandwidth request opportunity exists in one bandwidth request channel (BRCH). However, the base station may additionally allocate a bandwidth request channel composed of a plurality of bandwidth request opportunities within one bandwidth request channel for M2M mobile stations. The base station limits M2M mobile stations, which share the same STID, to individually transmit the bandwidth request only through one opportunity among bandwidth request opportunities within the bandwidth request channel (or including already allocated BR request channel opportunities). The MTC MSs, which are allocated different STIDs, may be set to use the same bandwidth request opportunities.

The base station may have the dedicated bandwidth request opportunity for each MS within the group, which shares the STID, through the AAI-REG-RSP message or AAI-HO-CMD message.

The base station may transmit configuration information for the bandwidth request channel composed of a plurality of bandwidth opportunities additionally allocated in the bandwidth request channel, which is allocated for one HTC terminal, through a broadcast channel, etc. which is newly defined for the M2M mobile station.

5. Dedicated BR Preamble Assignment

The base station may allocate and transmit the dedicated BR preamble for each MS for the group MSs, which use the same STID (S730). Here, the MS transmits the bandwidth request using the dedicated bandwidth request preamble allocated regardless of its own STID at the time of generating the bandwidth request preamble (S740). Further, separately, in the case of the STID information area of the quick access message of the bandwidth request, the MS transmits the STID actually allocated to the MS itself.

The base station may transmit the information on the dedicated bandwidth request preamble allocated to each MS within the group through the AAI-REG-RSP message which is communicated at the time of the network entrance of the MS, or may be transmitted the AAI-HO-CMD message in which the STID may be allocated in the target base station at the time of the handover. Further, a new type MAC management message may be defined and then the information may be transmitted through the new MAC managed. The dedicated bandwidth request preamble allocation information, which is shared between group MSs through the MAC management message, may be updated by the request of the base station or the mobile station.

<Method for Limiting the Flow ID (FID) of Mobile Stations within a Group>

IEEE 802.16m system, an example of a wireless communication system, supports a multiple connection to one terminal. Hence, the MS needs to identify a multiple of connections. In the IEEE 802.16m system, a connection identification (CID) is allocated for traffic addressing in the upper layer. The connection identification (CID) between the base station and the mobile station may be a combination of an STID and a flow ID (FID). The CID is for identifying the source of the traffic and the destination, that is, the connection identification.

However, in the case in which the STID is shared between MSs by the above methods, if individual MSs use the same FID within a MS group which shares the STID, the source MS or destination MS of the traffic may not be distinguished in the upper layer. That is, the CID according to the suggested STID sharing may not be identified in the upper layer of the base station.

Figure 8:
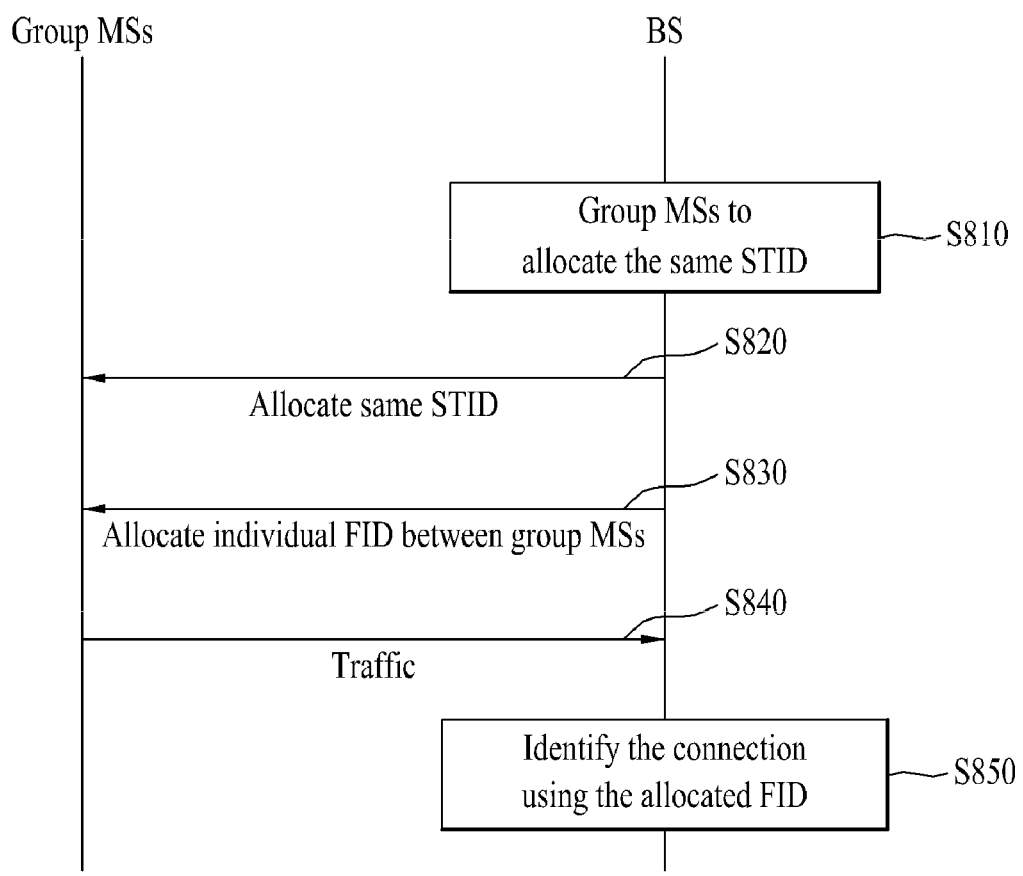
FIG. 8 illustrates a process for identifying a CDI of a group of terminals which share the same STID according to another exemplary embodiment of the present invention.

FIG. 8 illustrates a process for identifying a CDI of a group of terminals which share the same STID according to another exemplary embodiment of the present invention.

Referring to FIG. 8, as described with reference to FIGS. 5 and 6, the base station may group MSs to allocate the same STID (S810). In the process of network entrance of a plurality of MSs, the base station may allocate and transmit one same STID to the group MSs (S820). Hence, a plurality of grouped MSs share the same STID.

1. Use of Exclusive FIDs within Mobile Terminals within the Group

As a way for solving the problem, the FID between MSs may be set to be exclusively used in the group that uses the same STID. That is, the base station may allocate a unique FID for each MS of the group MSs that use the same STID (S830). Likewise, the base station may transmit the allocation information of the FID for each MS to each MS through the AAI-REG-RSP message which is communicated at the time of the MS's network entrance, or through the AAI-HO-CMD message to which the STID may be allocated in the target base station at the time of the handover (S830). Further, the information may be transmitted through a new MAC management message by defining a new type MAC management message (S830). The allocation information of the FID for each MS in the group MSs may be updated by the request of the base station or the MS through the MAC management message.

Likewise, as the base station allocates a unique FID to the MS within the group, if each MS within the group transmits the traffic (S840), the connection may be identified in the upper layer of the base station, and thus the source MS or destination MS of the traffic may be identified (S850).

2. Additional Method for Allocating MS Identification Information

The base station may allocate additional MS identification information for group MSs in which the STID is shared for distinguishing the source MS or destination MS of the traffic in the upper layer, and thereby the traffic source or traffic destination distinction in the upper layer may be used. For example, in the case in which the STID is shared, the ACID may be used in addition to the STID and the FID for connection identification, or in the case of the above time division STID sharing, the subframe index (or frame or superframe index) may be used in addition to the STID and the FID for connection identification.

Up to now, one of various methods, which are presented to solve the problem due to the STID sharing in downlink and uplink, may be continually used, or the methods may also be optionally configured depending on the situation. In the case of being optionally configured, the base station may transmit the signaling to the MSs within the group, respectively, through the AAI-REG-RSP message in which STID is allocated, the AAI-HO-CMD message, or a new type MAC management message. Further, such configuration information may be updated by the request of the base station or the MS through the MAC management message. Further, the signaling for all the above methods may also be transmitted through other MAC management messages such as the AAI-REG-REQ message, the AAI_RNG-REQ/RSP message and the AAI-SBC-REQ/REP message, etc. as well as the AAI-REG-RSP and AAI-HO-CMD messages.

Exemplary embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The method of receiving a downlink control channel and a bandwidth request channel by grouped mobile stations, to which the same STID or C-RNTI has been allocated, is industrially applicable to various communication systems such as IEEE 802.16, 3GPP LTE, LTE-A, etc.

The invention claimed is:

1. A method for receiving a bandwidth request by a base station in a wireless communication system, the method comprising:

transmitting a corresponding bandwidth request index to each of the multiple Machine-to-Machine (M2M) devices;

receiving, the bandwidth request including a corresponding bandwidth request index of a M2M device, from the M2M device; and identifying the M2M device using the corresponding bandwidth request index of the M2M device, wherein the corresponding bandwidth request index of the M2M device is different from that of another M2M device.

2. The method of claim 1, further comprising:

assigning the same station identifier (STID) to multiple M2M devices;

transmitting a same (STID) to the multiple M2M devices; and assigning, time regions in which the same STID is valid, to each of the multiple M2M devices; and transmitting, information regarding the assigned time regions for each of the multiple M2M devices, to at least one of the multiple M2M devices, wherein the assigned time regions are not overlapped between the multiple M2M devices, and wherein the same STID is valid only for the assigned time regions.

3. The method of claim 2, further comprising:

transmitting, signals through the assigned time regions, to at least one of the multiple M2M device.

4. The method of claim 2, wherein the time region is assigned in unit of frame.

5. The method of claim 2, wherein the information regarding the assigned time region comprises at least a periodicity value or an offset value of the assigned time region in which the same STID is valid.

6. The method of claim 2, wherein the information regarding the assigned time region is transmitted through a registration response message.

7. The method of claim 6, wherein the registration response message is an AAI-REG-RSP message.

8. The method of claim 1, wherein the corresponding bandwidth request index of the M2M device is received via a quick access message.

9. The method of claim 1, wherein the bandwidth request further comprises the same STID, and wherein the identifying is performed by further using the same STID.

10. A method for transmitting a bandwidth request by a Machine-to-Machine (M2M) device in a wireless communication system, the method comprising:

receiving an assigned bandwidth request index from a base station;

transmitting the bandwidth request including the assigned bandwidth request index to the base station, wherein the assigned bandwidth request index is different from that of another M2M device, and wherein the assigned bandwidth request index is used to identify the M2M device.

11. The method of claim 10, further comprising:

receiving an assigned station identifier (STID) from a base station, wherein the assigned STID is same as assigned to multiple M2M devices, receiving, information regarding an assigned time region in which the STID is valid for the M2M device, from the base station, wherein the assigned time region are not overlapped with time regions assigned to another M2M device, and wherein the same STID is valid only for the assigned time regions.

12. The method of claim 11, wherein the bandwidth request further comprises the assigned STID.

13. The method of claim 11, wherein the time region is assigned in unit of frame.

14. The method of claim 11, further comprising:
receiving, a signal through the assigned time region for the M2M device, from the base station.

15. The method of claim 11, wherein the information regarding the assigned time region comprises at least a periodicity value or an offset value of the assigned time region in which the same STID is valid for the M2M device.

16. The method of claim 11, wherein the information regarding the assigned time region is transmitted through a registration response message.

17. The method of claim 16, wherein the registration response message is an AAI-REG-RSP message.

18. The method of claim 10, wherein the assigned bandwidth request index is transmitted via a quick access message.

19. A base station for receiving a bandwidth request in a wireless communication system, the base station comprising:
a transmitter configured to transmit a corresponding bandwidth request index to each of the multiple Machine-to-Machine (M2M) devices;
a receiver configured to receive, the bandwidth request including a corresponding bandwidth request index of a M2M device, from the M2M device; and
a processor configured to identify the M2M device using the corresponding bandwidth request index of the M2M device,
wherein the corresponding bandwidth request index of the M2M device is different from that of another M2M device.

20. A Machine-to-Machine (M2M) device for transmitting a bandwidth request in a wireless communication system, the M2M device comprising:
a receiver;
a transmitter; and
a processor,
wherein the processor is configured to control that the receiver receives an assigned bandwidth request index from a base station and the transmitter transmits the bandwidth request including the assigned bandwidth request index to the base station,
wherein the assigned bandwidth request index is different from that of another M2M device, and
wherein the assigned bandwidth request index is used to identify the M2M device.

* * * * *